US008102621B2

(12) United States Patent
Hendriks et al.

(10) Patent No.: US 8,102,621 B2
(45) Date of Patent: Jan. 24, 2012

(54) INTEGRATED UPSTREAM SPOILER AND PARTICLE FILTER IN A HARD-DISK DRIVE (HDD)

(75) Inventors: Ferdinand Hendriks, Morgan Hill, CA (US); Charles Allan Brown, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 267 days.

(21) Appl. No.: 12/580,014

(22) Filed: Oct. 15, 2009

(65) Prior Publication Data

US 2011/0090592 A1 Apr. 21, 2011

(51) Int. Cl.
*G11B 33/14* (2006.01)
(52) U.S. Cl. ................................. 360/97.02
(58) Field of Classification Search .............. None
See application file for complete search history.

(56) References Cited

U.S. PATENT DOCUMENTS

| | | | |
|---|---|---|---|
| 5,060,100 A | 10/1991 | Mihara et al. | |
| 5,140,578 A * | 8/1992 | Tohkairin | 720/648 |
| 5,212,679 A * | 5/1993 | Tohkairin | 720/648 |
| 5,602,700 A | 2/1997 | Viskochil et al. | |
| 5,898,545 A | 4/1999 | Schirle | |
| 6,238,467 B1 | 5/2001 | Azarian et al. | |
| 7,209,319 B1 | 4/2007 | Watkins et al. | |
| 7,379,266 B1 | 5/2008 | Ou-Yang et al. | |
| 2002/0071202 A1 | 6/2002 | Myokan et al. | |
| 2003/0107839 A1 | 6/2003 | Smith | |
| 2008/0043369 A1 | 2/2008 | Takemori et al. | |
| 2009/0034125 A1* | 2/2009 | Chan et al. | 360/235.4 |
| 2009/0067086 A1 | 3/2009 | Kaneko et al. | |

FOREIGN PATENT DOCUMENTS

JP 62298076 12/1987

OTHER PUBLICATIONS

Design and Performance Test of Comb-Shaped Clamp/Spacer for Improvement of Recirculation Filter Efficiency in a Hard-Disk Drive, Sung-Eun Park et al., IEEE Transactions on Magnetics, vol. 45, Issue: 1, Part 1, on pp. 201-205, Publication Date: Jan. 2009, available online at: http://ieeexplore.ieee.org/stamp/stamp.jsp?tp=&arnumber=4773573&isnumber=4773508.
A New Air Circulation Path for a High-Recording-Density Magnetic Hard-Disk Drive, Yamaguchi, Y. et al., IEEE Transactions on Magnetics, vol. 25, Issue: 5, on pp. 3378-3380, Publication Date: Sep. 1989, available online at: http://ieeexplore.ieee.org/stamp/stamp.jsp?tp=&arnumber=42307&isnumber=1621.

* cited by examiner

*Primary Examiner* — Mark Blouin
(74) *Attorney, Agent, or Firm* — Mahamedi Paradice Kreisman LLP; Christopher J. Brokaw

(57) ABSTRACT

Approaches for integrating an upstream spoiler with a particle filter in a hard-disk drive (HDD). According to an approach, a single part may comprise an upstream spoiler and an opening. The single part has a structure which enables an airborne particle filter to be positioned over or within the opening. The airborne particle filter, which covers the opening, has a curvature that follows the curvature of a shroud. When the upstream spoiler diverts a flow of air, which circulates within the enclosure when the magnetic-recording disk is rotating, from the magnetic-recording head, the upstream spoiler creates an area of relatively greater pressure. Air in the area of greater pressure flows through the airborne particle filter to an area of relatively lesser pressure, thereby removing airborne particles within the enclosure of the HDD. Alternately, the airborne particle filter may be positioned within slits present in the shroud and the upstream spoiler.

20 Claims, 7 Drawing Sheets

INTEGRATED UPSTREAM SPOILER AND PARTICLE FILTER IN A HARD-DISK DRIVE (HDD)

FIELD OF THE INVENTION

Embodiments of the invention relate to integrating an upstream spoiler with a particle filter in a hard-disk drive (HDD).

BACKGROUND OF THE INVENTION

The operation of certain computer equipment can be negatively affected by the presence of environmental hazards, such as airborne contaminants. To prevent this harm from occurring, some sensitive equipment may be housed in an enclosure that is designed to keep out airborne contaminants.

An example of a piece of sensitive equipment housed within a protective enclosure is a hard-disk drive (HDD). An HDD is a non-volatile storage device, which is housed in a protective enclosure, that stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of a platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

Very small airborne particles, such as the size of 10 nm to 1000 nm (1 micron), may adhere to the air bearing surfaces of either a read/write head or deposit on the surface of the magnetic platters (disk stack). When the surface of either a read/write head or a platter becomes attached to an airborne particle, it is more likely that a read/write head may not read data properly or may scrape across the surface of a platter, which could grind away the thin magnetic film of the platter and cause data loss and potentially render the HDD inoperable.

As a natural part of the manufacturing process, a certain amount of airborne particles may be introduced into the interior of the enclosure of the HDD. Additionally, during operation, certain parts within the interior of the HDD may rub or bump each other in a manner that causes airborne particles to be released. To remove airborne particles from the interior of a HDD, airborne particle filters may be positioned inside the interior of the enclosure as well as around an air passage in the enclosure used to equalize the pressure between the interior and the exterior of the enclosure. These airborne particle filters are typically situated in a flow of air caused by the rotation of the platters. As the air flows through the airborne particle filters, particles carried by the air may become trapped in the airborne particle filter, thereby cleaning the air.

As the amount of air flowing through an airborne particle filter increases, the number of airborne particles which will be trapped by the airborne particle filter also increases. However, as the rate of the air flow circulating within the enclosure of the HDD increases, the likelihood that the circulating air flow will disturb the operation of the magnetic read/write head also increases. Thus, airborne particle filters are typically designed to collect as much airborne particles from the air as possible without disturbing the proper operation of the magnetic read/write head.

In order to create an appropriate pressure drop across an airborne particle filter to ensure a desired rate of air flow through the airborne particle filter, certain HDDs may employ a bypass channel, which is a channel through which air may flow. While a bypass channel may be helpful in directing the flow of air, a bypass channel can create an aerodynamic disturbance where the bypass channel connects with the shroud which surrounds the platters. Such aerodynamic disturbances are undesirable as they may excite disk vibrations and disturb the operation of the magnetic read/write head or prevent the desired amount of airborne particles to be collected from the airborne particle filters.

SUMMARY OF THE INVENTION

Techniques are provided for integrating an upstream spoiler with a particle filter in a hard-disk drive (HDD). According to an embodiment of the invention, an HDD includes a single part that comprises an upstream spoiler and an opening. The single part has a structure which enables an airborne particle filter to be positioned over or within the opening. The airborne particle filter, when positioned such that it covers the opening, has a curvature that follows the curvature of a shroud that surrounds a majority of the perimeter of the magnetic-recording disk of the HDD. When the upstream spoiler diverts a flow of air (which circulates within the enclosure due to the rotation of the magnetic-recording disk) from the magnetic-recording head, the upstream spoiler creates an area of relatively greater pressure preceding the upstream spoiler in the flow of air. Air in the area of greater pressure flows through the airborne particle filter to an area of relatively lesser pressure, thereby removing airborne particles within the enclosure of the HDD.

According to another embodiment of the invention, an HDD has a shroud that surrounds a majority of the perimeter of the magnetic-recording disk. A portion of the shroud comprises a slit that is shaped to accommodate a first side of an airborne particle filter. The HDD also includes an upstream spoiler which has one or more wings. A portion of the upstream spoiler comprises another slit that is shaped to accommodate a second side of the airborne particle filter. The airborne particle filter may be secured within the HDD by positioning the first side of the airborne particle filter slit of the shroud and positioning the second side of the airborne particle filter within the slit of the upstream spoiler. When the airborne particle may have a curvature that follows the curvature of the shroud.

Advantageously, positioning the airborne particle filter near the area of greater relative pressure created by the upstream spoiler yields a variety of different benefits. For example, HDDs employing embodiments of the invention need not employ a bypass channel and a bypass filter. As a result, turbulence created near the inlet and exhaust of the bypass channel may be avoided. By reducing the turbulence within the HDD, the magnetic-reading head is less prone to experiencing errors in operation. Also, embodiments of the invention may be implemented with less time and cost than current approaches for shielding a read/write head from air flow and filtering airborne contaminants.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for integrating an upstream spoiler with a particle filter in a hard-disk drive (HDD) are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

PHYSICAL DESCRIPTION OF ILLUSTRATIVE EMBODIMENTS OF THE INVENTION

Figure 1:
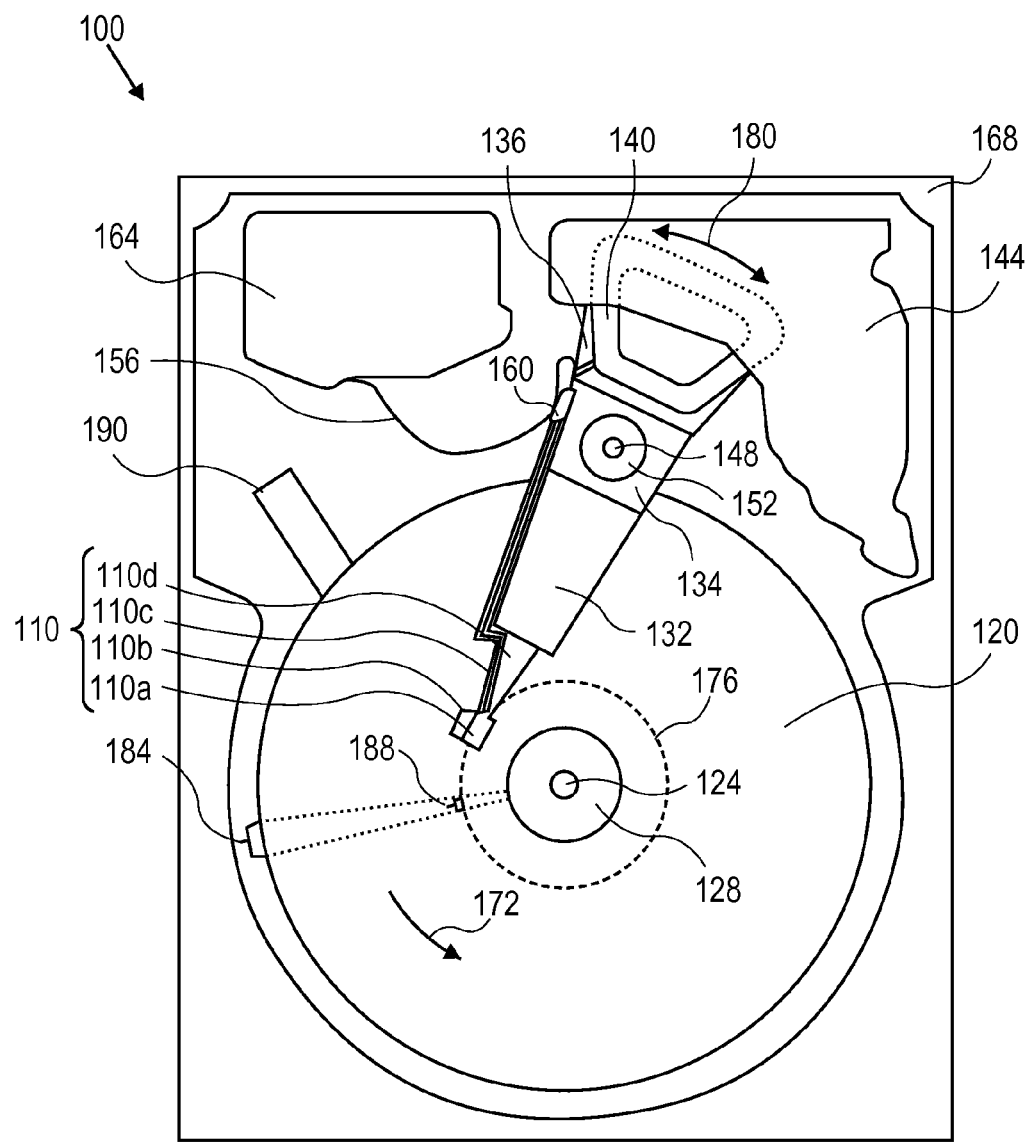
FIG. 1 is an illustration of a plan view of an HDD according to an embodiment of the invention.

With reference to FIG. 1, in accordance with an embodiment of the present invention, a plan view of a HDD 100 is shown. FIG. 1 illustrates the functional arrangement of components of the HDD including a slider 110b including a magnetic-recording head 110a. The HDD 100 includes at least one HGA 110 including the head 110a, a lead suspension 110c attached to the head 110a, and a loadbeam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 entrains air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the present invention also encompass HDD 100 that includes the HGA 110, the disk 120 rotatably mounted on the spindle 124, the arm 132 attached to the HGA 110 including the slider 110b including the head 110a. Therefore, embodiments of the present invention incorporate within the environment of the HDD 100, without limitation, the subsequently described embodiments of the present invention for integrating an upstream spoiler with a particle filter as further described in the following discussion. Similarly, embodiments of the present invention incorporate within the environment of the HGA 110, without limitation, the subsequently described embodiments of the present invention for integrating an upstream spoiler with a particle filter as further described in the following discussion.

Figure 2:
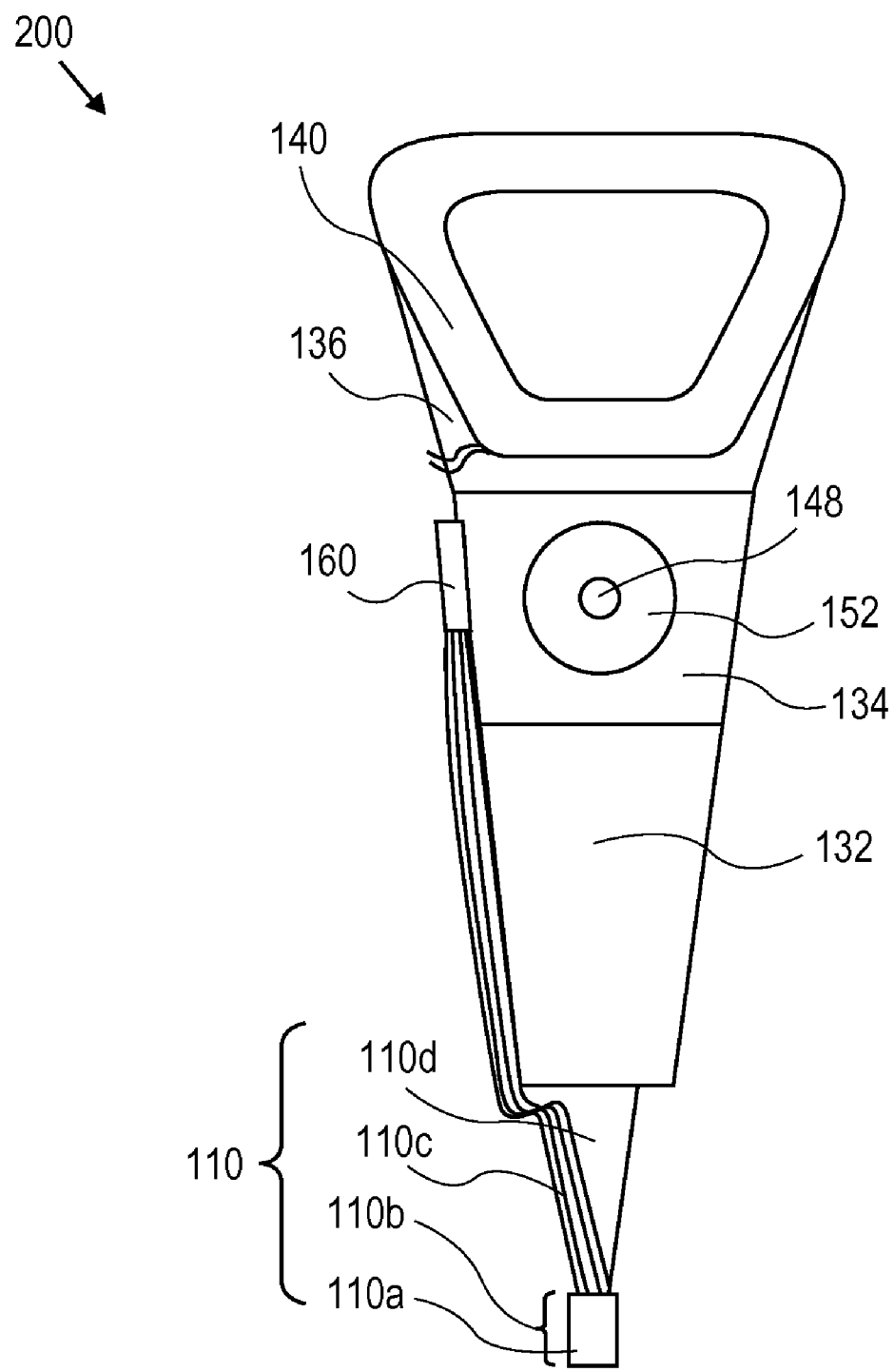
FIG. 2 is an illustration of a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Having described an illustrative description of a hard-disk drive (HDD) according to an embodiment of the invention, additional information about a bypass channel and a bypass filter will now be presented.

BYPASS CHANNEL AND BYPASS FILTER

Figure 3A:
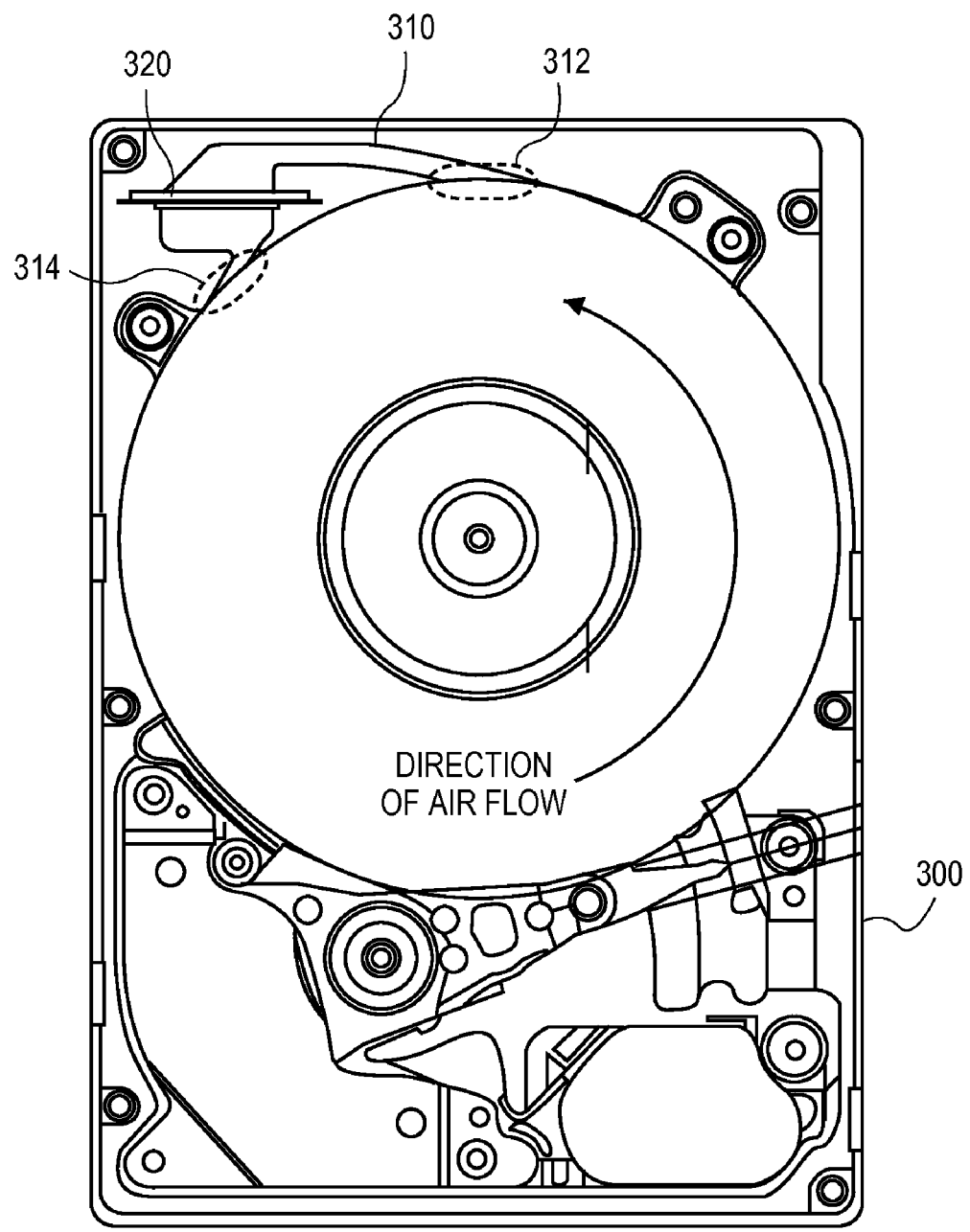
FIGS. 3A and 3B are illustrations of a HDD having a bypass channel according to an embodiment of the invention.

FIG. 3A is an illustration of an HDD 300 having a bypass channel 310 according to an embodiment of the invention. As illustrated by FIG. 3A, bypass channel 310 comprises inlet 312 and exhaust 314. FIG. 3A shows that the air within the interior of HDD 300 circulates counter-clockwise when the platters are rotating. Thus, when the platters of HDD 300 are rotating, air flows into inlet 312 of bypass channel 310 and air flows out of exhaust 314.

The air flowing through bypass channel 310 is filtered by bypass filter 320. Bypass filter 320 may be referred to as an "11 o'clock filter" by those skilled in the art, as the relative location of bypass filter 320 is at the 11 o'clock position if HDD is viewed as a clock face.

Figure 3B:
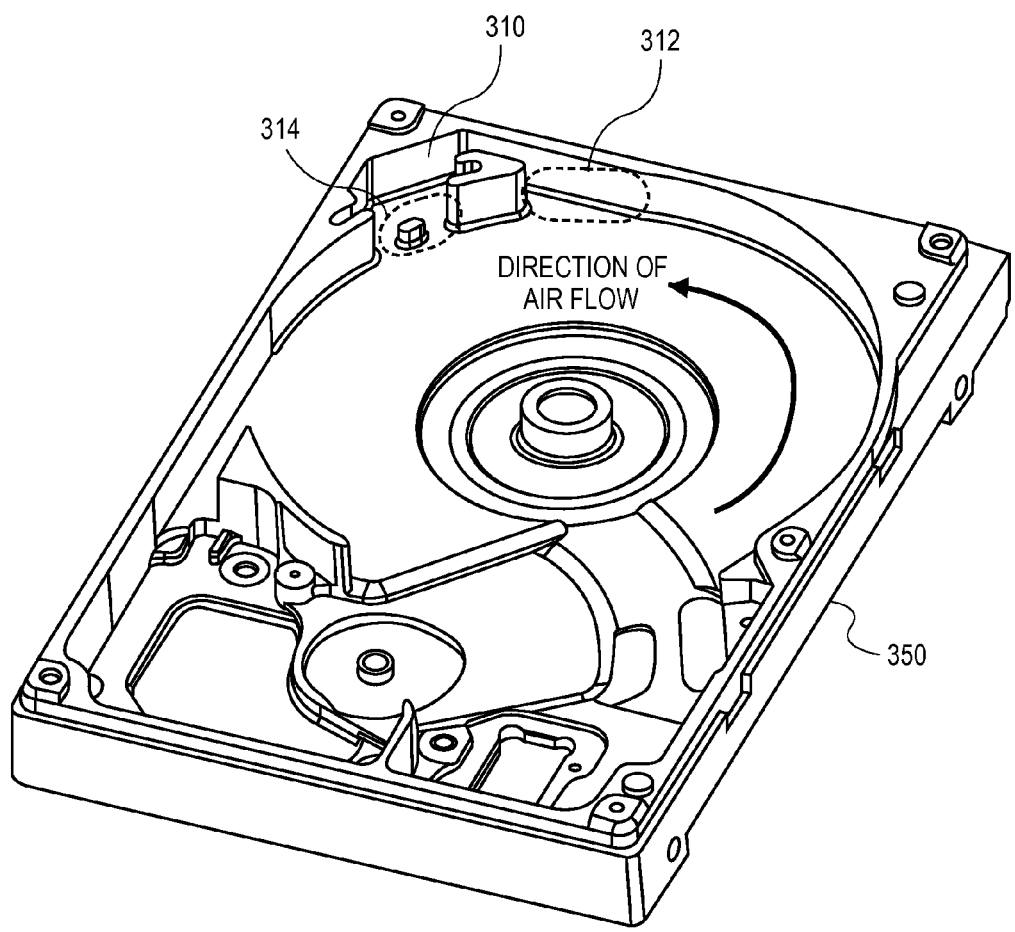

FIG. 3B is another illustration of an HDD 350 having a bypass channel 310 according to an embodiment of the invention. HDD 350 of FIG. 3B is shown without a bypass filter.

While a bypass channel may be helpful in directing the flow of air across a bypass filter, a bypass channel can create aerodynamic disturbances where the bypass channel connects with the shroud, such as inlet 312 and exhaust 314. Such aerodynamic disturbances are undesirable as they may disturb the operation of the magnetic read/write head or prevent the desired amount of airborne particles to be collected from the airborne particle filters. As shall be described below, certain embodiments of the invention may avoid such aerodynamic disturbances by not including a bypass channel.

INTEGRATED UPSTREAM SPOILER AND PARTICLE FILTER

Figure 4:
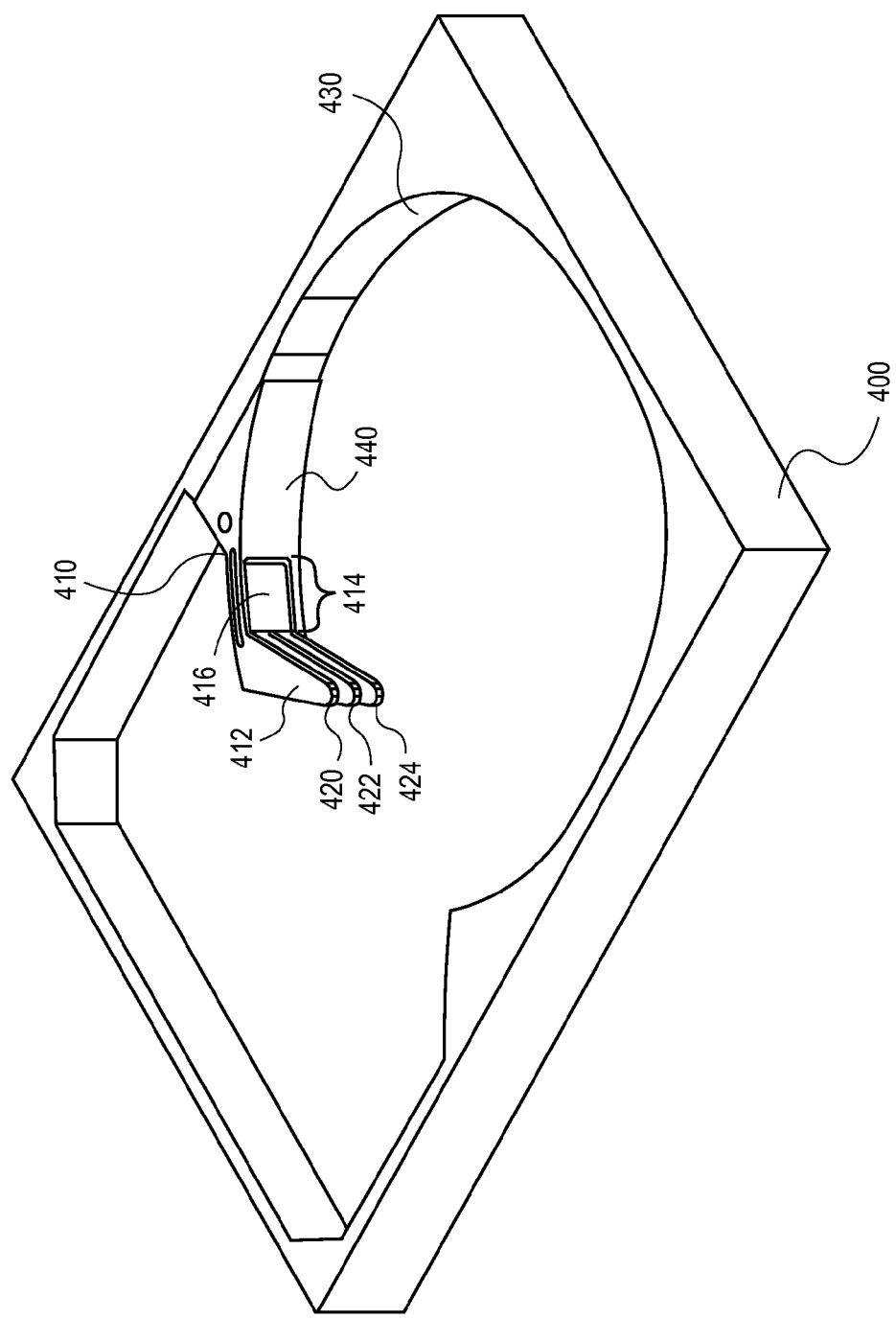
FIG. 4 is an illustration of an integrated upstream spoiler and airborne particle filter according to one embodiment of the invention.

FIG. 4 is an illustration of HDD 400 comprising an integrated upstream spoiler and airborne particle filter (referred to herein as integrated spoiler/filter 410) according to an embodiment of the invention. The purpose of an upstream spoiler is to protect the head from being disturbed by the circulating air flow caused by the rotation of the platters when the HDD is in operation. The airborne particle filter serves to trap harmful airborne particles within the interior of the HDD. The airborne particle filter may comprise carbon material to aid in the absorption of harmful chemical vapor.

As shown by FIG. 4, integrated spoiler/filter 410 may be implemented as a single part. For example, integrated spoiler/filter 410 may be manufactured as a single injection molded plastic part having a filler that dissipates static electricity. Integrated spoiler/filter 410 may be constructed using a stiffening agent or carbon fibers.

In an embodiment, integrated spoiler/filter 410 comprises upstream spoiler 412 and opening 414, and may optionally comprise curved extension 440. Upstream spoiler 412 may have one or more wings, such as 420, 422, and 424. The shape of upstream spoiler 412 diverts a flow of air towards the inside of the disk, which circulates within the enclosure of the HDD when the platters rotate, from the magnetic-recording head (not depicted in FIG. 4). Those skilled in the art shall appreciate that upstream spoiler 412 may comprise any number of wings, each of which may be disposed between two platters.

In an embodiment, integrated spoiler/filter 410 has a structure and/or shape such that airborne particle filter 416 may be positioned or affixed over or within opening 414. Embodiments may position or affix airborne particle filter 416 over or within opening 414 in a variety of different ways. For example, integrated spoiler/filter 410 may be manufactured to comprise a slit that allows airborne particle filter 416 to be positioned within opening 414 of single part 402. Airborne particle filter 416 may be slid in or positioned within the slit during manufacturing of integrated spoiler/filter 410 or HDD 400.

Additionally or alternately, airborne particle filter 416 may be bonded or affixed to integrated spoiler/filter 410. Airborne particle filter 416 may be bonded or affixed to integrated spoiler/filter 410 once airborne particle filter 416 is slid in the slit of integrated spoiler/filter 410 or airborne particle filter 416 may be bonded or affixed to the back or front of opening 414 so that airborne particle filter 416 covers opening 414. Airborne particle filter 416 may be bonded or affixed to integrated spoiler/filter 410 using a variety of different attachment methods, such as heat sealing, ultrasonic bonding, or using an adhesive.

HDD 400 also comprises shroud 430 that surrounds a majority of the perimeter of the platters (not depicted in FIG. 4). Advantageously, as airborne particle filter 416 may be implemented by integrated spoiler/filter 410, there may be no need to include a bypass channel to facilitate the flow of air over a bypass filter, as the circulating air may be filtered using airborne particle filter 416 in integrated spoiler/filter 410. Thus, in an embodiment (as shown in FIG. 4), shroud 430 does not have a bypass channel (or a bypass filter).

In another embodiment, shroud 430 may have a bypass channel and a bypass filter. Such as embodiment may be used when it is desirable to filter the air within an HDD by two airborne particle filters, e.g., if the clean up rate needs to be improved, two airborne particle filters may be used instead of a single airborne particle filter. In this way, the air circulating within the interior of the HDD may be filtered by airborne particle filter 416 in integrated spoiler/filter 410 as well as the bypass filter (or "11 o'clock filter") in the bypass channel.

In this approach, the characteristics of each of the airborne particle filters may be configured such that airborne particle filter 416 and the bypass filter work well together. For example, since two filters are being used in this embodiment, it may be desirable to employ filters that allow a desired amount of air to flow through both filters, since a certain rate of air flow through each filter is desirable to ensure that the desired amount of airborne particles are filtered from each airborne particle filter.

After the airborne particle filter is positioned or affixed over or within opening 414, airborne particle filter 416 may be flush or substantially flush with the curvature of shroud 430. In certain embodiments, airborne particle filter 416 may protrude slightly from integrated spoiler/filter 410. When airborne particle filter 416 is positioned or affixed over or within opening 414, airborne particle filter 416 may have a curvature that follows the curvature of shroud 430.

In certain embodiments (such as the embodiment depicted in FIG. 4), integrated spoiler/filter 410 may comprise curved extension 440 that forms a portion of shroud 430. Curved extension 440 has a curvature that follows the curvature of shroud 430. As shown by FIG. 4, while curved extension 440 is a part of integrated spoiler/filter 410, neither upstream spoiler 412 nor opening 414 are comprised within curved extension 440. Curved extension 440 may be of a variety of different lengths, as the particular length of curved extension 440 may vary from implementation to implementation, as the length of curved extension 440 affects the relative position of airborne particle filter 416 in the interior of HDD 400.

Figure 5:
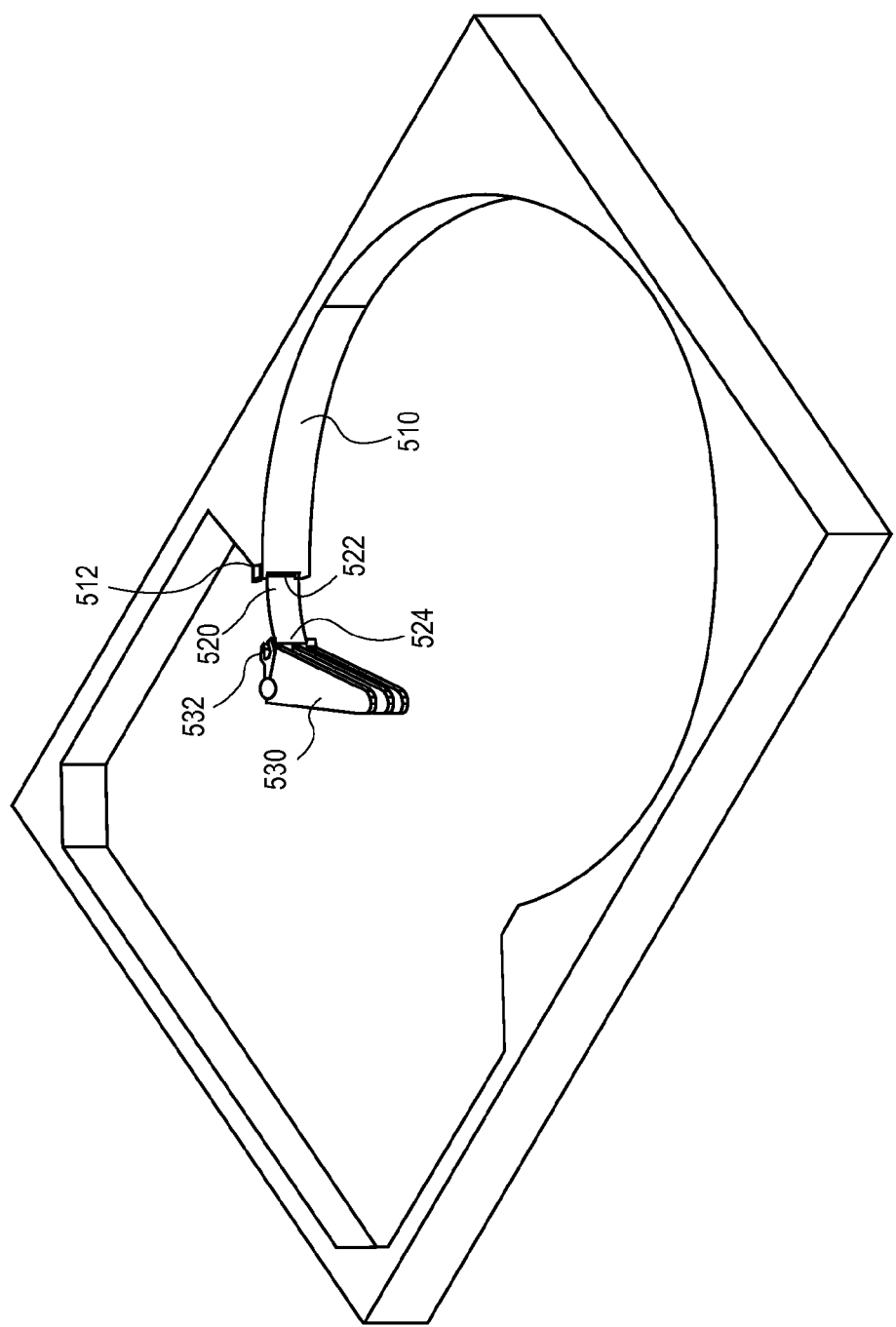
FIG. 5 is an illustration of an integrated upstream spoiler and airborne particle filter according to another embodiment of the invention.

FIG. 5 is an illustration of an integrated upstream spoiler and airborne particle filter according to another embodiment of the invention. As shown by FIG. 5, shroud 510 comprises a slit 512 that is shaped to accommodate side 522 of airborne particle filter 520. Upstream spoiler 530 comprises a second slit 532 that is shaped to accommodate side 524 of airborne particle filter 520. Airborne particle filter 520 may have a curvature that follows the curvature of shroud 510. Side 512 of airborne particle filter 520 is positioned within slit 512 of shroud 510, and side 524 of airborne particle filter 520 is positioned within slit 532 of upstream spoiler 530. Airborne particle filter 510 may be, but need not be, bonded or affixed to slit 512 and slit 532 using a variety of different attachment methods, such as heat sealing, ultrasonic bonding, or using an adhesive.

Figure 6:
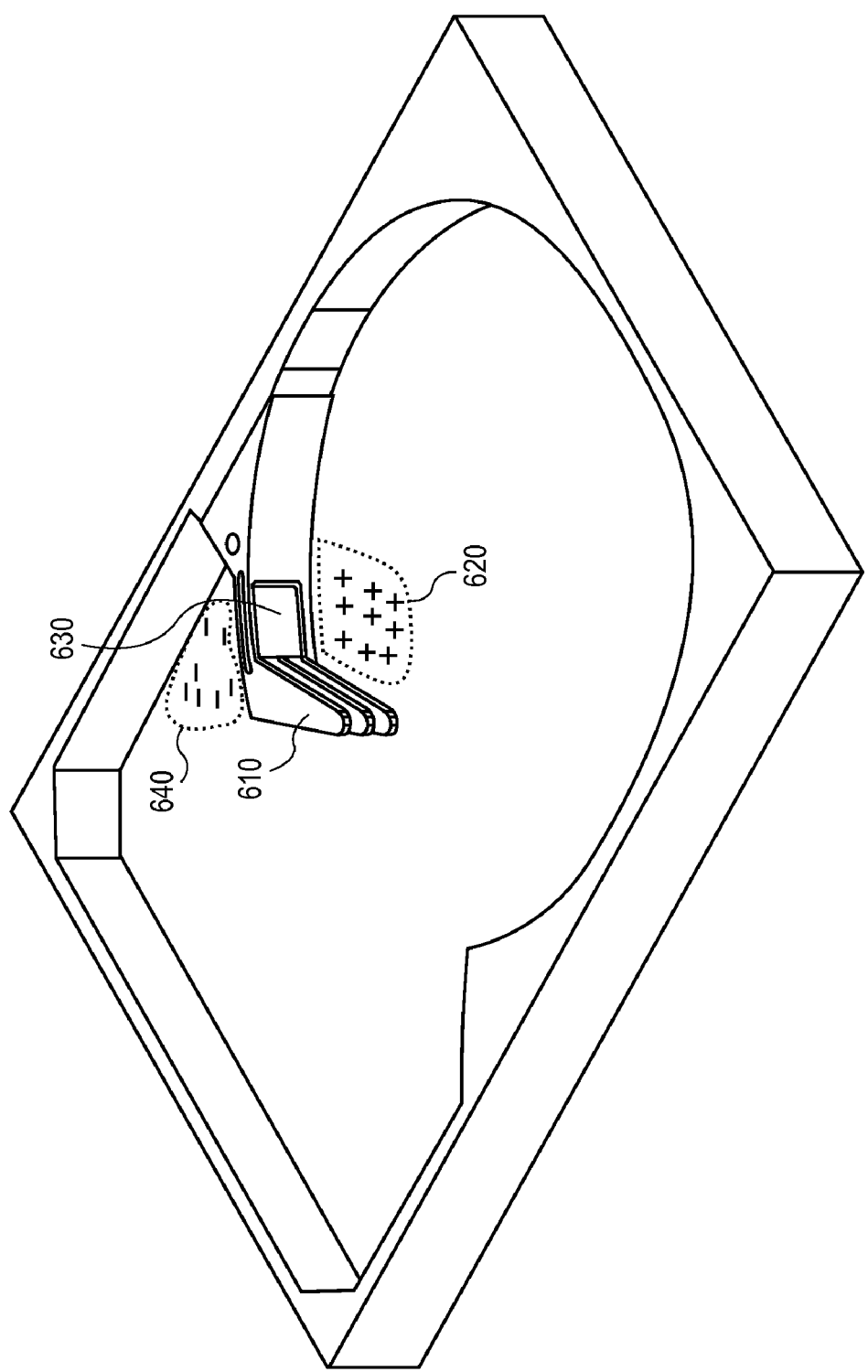
FIG. 6 is a diagram illustrating the differential pressure within the interior of a hard-disk drive (HDD) according to an embodiment of the invention.

FIG. 6 is a diagram illustrating the differential pressure within the interior of a hard-disk drive (HDD) according to an embodiment of the invention. As shown by FIG. 6, integrated spoiler/filter 610 creates an area of relatively greater pressure 620 as a result of diverting the flow of air. As a result, a portion of the air in the area of greater pressure 620 flows through the airborne particle filter 630 to an area of relatively lesser pressure 640. The area of relatively lesser pressure 640 may be referred to as at the cavity, and the pressure in the cavity is relatively constant since there is no high speed flow of air occurring therein.

Embodiments of the invention provide a desirable alternative to damper plates, as embodiments are easier to install in an HDD than damper plates. The wings of an upstream filter may be rotated in position, thereby allowing all platters to be installed before the integrated spoiler/filter. On the other hand, a damper plate must be installed in-between each platter, thereby requiring the damper plates to be installed with the platters, which can complicate installation. As a result, embodiments of the invention may be installed in an HDD in less time and expense than damper plates.

Additionally, there are certain savings due to integrated spoiler/filter being implemented as a single part, which reduces cost and time and complexity of installation. Further, embodiments of the invention provide a mechanism for securely positioning airborne particle filters. As a result, it is less likely that an airborne particle filter will fall out of position during manufacturing of the HDD.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
an enclosure;
a magnetic-recording head;
a magnetic-recording disk rotatably mounted on a spindle;
a drive motor having a motor shaft attached to said spindle for rotating said magnetic-recording disk;
a voice-coil motor configured to move said magnetic-recording head to access portions of said magnetic-recording disk;
a shroud that surrounds a majority of the perimeter of the magnetic-recording disk;
a single part comprising:
an upstream spoiler having one or more wings, wherein the shape of the upstream spoiler diverts a flow of air, which circulates within the enclosure when the magnetic-recording disk is rotating, from the magnetic-recording head, and
an opening, wherein the single part has a structure which enables an airborne particle filter to be positioned over or within the opening; and
the airborne particle filter having a curvature that follows the curvature of the shroud, wherein the airborne particle filter is positioned over the opening of the single part.

2. The hard-disk drive (HDD) of claim 1, wherein the single part comprises a curved extension that forms a portion of the shroud, wherein the curved extension has a curvature that follows the curvature of the shroud, and wherein neither upstream spoiler nor the airborne particle filter are comprised within the curved extension of the single part.

3. The hard-disk drive (HDD) of claim 1, wherein the airborne particle filter is flush or substantially flush with the curvature of the shroud.

4. The hard-disk drive (HDD) of claim 1, wherein the single part is manufactured as a single injection molded plastic part having a filler that dissipates static electricity.

5. The hard-disk drive (HDD) of claim 1, wherein the shroud does not have a bypass channel.

6. The hard-disk drive (HDD) of claim 1, wherein the shroud does have a bypass channel, wherein the bypass channel has a bypass filter covering an opening thereof, and wherein the characteristics of the airborne particle filter are designed to optimize airborne particle collection through the airborne particle filter and the bypass filter.

7. The hard-disk drive (HDD) of claim 1, wherein the single part is manufactured to comprise a slit that allows the airborne particle filter to be positioned within the single part.

8. The hard-disk drive (HDD) of claim 1, wherein the airborne particle filter is bonded to the single part to cover the opening of the single part.

9. A hard-disk drive (HDD), comprising:
an enclosure;
a magnetic-recording head;
a magnetic-recording disk rotatably mounted on a spindle;
a drive motor having a motor shaft attached to said spindle for rotating said magnetic-recording disk;
a voice-coil motor configured to move said magnetic-recording head to access portions of said magnetic-recording disk;
a shroud that surrounds a majority of the perimeter of the magnetic-recording disk, wherein a portion of the shroud comprises a first slit that is shaped to accommodate a first side of an airborne particle filter;
an upstream spoiler having one or more wings, wherein the shape of the upstream spoiler diverts a flow of air, which circulates within the enclosure when the magnetic-recording disk is rotating, from the magnetic-recording head, wherein a portion of the upstream spoiler comprises a second slit that is shaped to accommodate a second side of the airborne particle filter; and
the airborne particle filter having a curvature that follows the curvature of the shroud, wherein the first side of the airborne particle filter is positioned within the first slit of the shroud, and wherein the second side of the airborne particle filter is positioned within the second slit of the upstream spoiler.

10. The hard-disk drive (HDD) of claim 9, wherein the airborne particle filter is bonded to the shroud at the first slit and bonded to the upstream spoiler at the second slit using heat sealing, ultrasonic bonding, or an adhesive.

11. The hard-disk drive (HDD) of claim 9, wherein the airborne particle filter is flush or substantially flush with the curvature of the shroud.

12. The hard-disk drive (HDD) of claim 9, wherein the shroud does not have a bypass channel.

13. The hard-disk drive (HDD) of claim 9, wherein the shroud does have a bypass channel, wherein the bypass channel has a bypass filter covering an opening thereof, and wherein the characteristics of the airborne particle filter are designed to optimize airborne particle collection through the airborne particle filter and the bypass filter.

14. The hard-disk drive (HDD) of claim 9, wherein the airborne particle filter comprises carbon material to aid in the absorption of chemical vapor.

15. An upstream spoiler, comprising:
the upstream spoiler having one or more wings, wherein the shape of the upstream spoiler diverts a flow of air, which circulates within an enclosure of a hard-disk drive (HDD) when a magnetic-recording disk is rotating, from a magnetic-recording head; and
an airborne particle filter having a curvature that follows the curvature of a shroud,
wherein the upstream spoiler creates an area of relatively greater pressure as a result of diverting the flow of air when the magnetic-recording disk is rotating, and wherein a portion of the air in the area of greater pressure flows through the airborne particle filter to an area of relatively lesser pressure.

16. The upstream spoiler of claim 15, wherein the airborne particle filter comprises a curved extension that forms a portion of the shroud, and wherein the curved extension has a curvature that follows the curvature of the shroud.

17. The upstream spoiler of claim 15, wherein a single part comprises the upstream spoiler and an opening, wherein the opening has a structure which enables the airborne particle filter to be positioned over the opening, and wherein the single part is manufactured as a single injection molded plastic part having a filler that dissipates static electricity.

18. The upstream spoiler of claim 17, wherein the single part is manufactured to comprise a slit that allows the airborne particle filter to be positioned within the single part.

19. The upstream spoiler of claim 17, wherein the airborne particle filter is bonded to the single part to cover the opening of the single part.

20. The upstream spoiler of claim 15, wherein the airborne particle filter comprises carbon material to aid in the absorption of chemical vapor.

* * * * *